US009164815B2

(12) United States Patent
Li

(10) Patent No.: US 9,164,815 B2
(45) Date of Patent: Oct. 20, 2015

(54) METHOD FOR CALLING APPLICATION MODULE AND MOBILE TERMINAL

(75) Inventor: Xiangyang Li, Shenzen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 216 days.

(21) Appl. No.: 14/112,204

(22) PCT Filed: Nov. 11, 2011

(86) PCT No.: PCT/CN2011/082070
§ 371 (c)(1),
(2), (4) Date: Oct. 16, 2013

(87) PCT Pub. No.: WO2012/155469
PCT Pub. Date: Nov. 22, 2012

(65) Prior Publication Data
US 2014/0040918 A1 Feb. 6, 2014

(30) Foreign Application Priority Data

Aug. 9, 2011 (CN) .......................... 2011 1 0226874

(51) Int. Cl.
*G06F 13/00* (2006.01)
*G06F 9/54* (2006.01)
*H04M 1/725* (2006.01)

(52) U.S. Cl.
CPC .............. *G06F 9/54* (2013.01); *H04M 1/72522* (2013.01); *H04M 1/72552* (2013.01); *H04M 2250/70* (2013.01)

(58) Field of Classification Search
CPC .............................. G06F 9/4443; H04L 29/06
USPC .......................................... 719/310; 715/762
See application file for complete search history.

(56) References Cited

U.S. PATENT DOCUMENTS 5,634,102 A * 5/1997 Capps ........................... 715/744
7,493,560 B1 * 2/2009 Kipnes et al. ................. 715/729
(Continued)

FOREIGN PATENT DOCUMENTS

CN 101860626 10/2010
CN 102023795 4/2011
(Continued)

OTHER PUBLICATIONS

International Search Report dated Nov. 22, 2012 in corresponding International Patent Application No. PCT/CN2011/082070.

*Primary Examiner* — Andy Ho
(74) *Attorney, Agent, or Firm* — Pillsbury Winthrop Shaw Pittman, LLP

(57) ABSTRACT

A method for calling an application module and a mobile terminal thereof are provided in the present document, which can call the application module quickly during text editing. The method includes that: during the text editing, after the mobile terminal detects an identifier for calling an application, it determines that conditions for calling the application module are satisfied and calls the application module. The conditions include receiving a command from user to confirm calling the application. The mobile terminal includes a detecting module, a condition judging module and a calling module. The embodiments of the present invention call each application module instantly during the text inputting, and in addition, the final required data are inserted directly into the text editing position to reduce users' operation procedures, thus greatly improving friendliness of man-machine interaction, the overall efficiency, speed and convenience of input, and making users' input experience improved dramatically.

15 Claims, 2 Drawing Sheets

(56) References Cited

U.S. PATENT DOCUMENTS

| | | | |
|---|---|---|---|
| 8,074,215 B2* | 12/2011 | Cohen et al. | 717/174 |
| 2001/0044326 A1 | 11/2001 | Shibuya | |
| 2012/0011463 A1* | 1/2012 | Payne et al. | 715/780 |

FOREIGN PATENT DOCUMENTS

| | | |
|---|---|---|
| EP | 1513325 A1 | 3/2005 |
| EP | 1786186 A2 | 5/2007 |
| JP | 2011-45005 | 3/2011 |

* cited by examiner

METHOD FOR CALLING APPLICATION MODULE AND MOBILE TERMINAL

CROSS-REFERENCE TO PRIOR APPLICATIONS

This application is a National Stage of PCT/CN2011/082070, filed Nov. 11, 2011, which claims the benefit of priority from Chinese Application No. 201110226874.5, which was filed on Aug. 9, 2011, which are incorporated herein in their entirety by reference.

TECHNICAL FIELD

The present document relates to the field of mobile communication, and more particularly, to a method for calling application module and a mobile terminal thereof.

BACKGROUND OF THE RELATED ART

Today's society has entered an information-oriented era, and people are not able to adapt to the fast-paced modern life and work without information exchange and communication. With the development of mobile communication technology, mobile communication terminals such as mobile phones have become indispensable necessities in people's lives in order to allow people to carry on with anyone at anywhere to timely and effectively exchange information. Especially, thanks to the development of next generation communication technologies such as 3G and 4G, functions and services supported by mobile terminals have also reached an unprecedented richness and diversity, in addition to traditional voice communication, data communication plays an increasingly important role in meeting people's diversified and personalized communication services, meanwhile, the enhancement of the performance of the mobile terminal hardware and the intelligence of the software make operating applications such as short message service (SMS), electronic mail (e-mail), online instant chat, micro-blog and document processing on the mobile phone become a reality and have brought significant convenience to people's lives and work. However, the variety of data services of the above-mentioned mobile terminals are inseparable from text input, and the efficiency of text input has become a key aspect that seriously affects a variety of service experience.

In text editing and inputting process, people often need to perform some incidental operations, for example, the user may need to input certain data in the process of editing a short message, and for these data, it needs to perform related calculation, the traditional way is to exit text editing interface, bring up the calculator to calculate and record the result, and then return to the editing interface and input the result; another example is that, in the editing process, the user needs to enter a friend's number or related information, the traditional way is also to exit the current editing interface, enter into the card holder module to find the relevant information such as the friend's number or address, and manually record the information and then re-enter the editing interface for editing and inputting; still another example is that, during the editing process, it needs to view and input schedule information, needs to convert units and currencies, or needs to look up world time information, etc. there are a lot of similar cases that need to call a certain application module and interrupt the current editing status. This traditional operation makes the input inefficient, and the mode of suspending the current text input interface, entering into another module, and then closing the called application module, returning back to the editing interface, and inputting the previously acquired result is too cumbersome and is easy to make mistakes during operations, thus seriously affects the user experience.

SUMMARY OF THE INVENTION

The technical problem to be solved in the present document is to provide a method for calling an application module and a mobile terminal to quickly call the application module in a text editing process.

To solve the above-mentioned technical problem, the present document provides a method for calling an application module, comprising:

in a text inputting process, after a mobile terminal detects an identifier for calling an application, it determining that conditions for calling said application module are met, and calling said application module, wherein said conditions comprise receiving a command from a user to confirm calling said application.

Optionally, after calling said application module, said method further comprises: returning to said text inputting interface after operations by said user on said application module are complete.

Optionally, after returning to said text input interface, said method further comprises: replacing said identifier with the operation result obtained by operating said module.

Optionally, said identifier for calling said application comprises an identification and an application identity, wherein said identification is used by said mobile terminal to identify that said identifier is an identifier for calling said application, and said application identity is used to indicate said application to be called.

Optionally, before said text inputting process, said method further comprises, pre-setting on said mobile terminal a set of applications that can be called, and wherein each application in said set corresponds to one or more application identities.

Optionally, said conditions further comprise: said identification being correct, and said application indicated by said application identity belonging to said preset set.

Optionally, after said mobile terminal detects said identifier for calling said application, said method further comprises: reminding said user of whether to call said application or not.

Optionally, the step of reminding said user of whether to call said application or not comprises:

using a way of highlighting said identifier to popping-up a reminding box to said user to remind said user of whether to call said application or not.

To solve the above-mentioned technical problem, the present document also provides a mobile terminal for calling an application module, comprising a detecting module, a condition judging module and a calling module, wherein:

said detection module is configured to: in a text inputting process, detect whether there is an identifier for calling an application or not;

said condition judging module is configured to: after said detecting module detects said identifier for calling said application, judge whether conditions for calling said application module are met or not, wherein said conditions comprise receiving a command from said user to confirm calling said application;

said calling module is configured to: after said condition judging module determines that said conditions for calling said application module are met, call said application module.

Optionally, said mobile terminal further comprises a scene switching module, which is configured to: after the operation by said user on the module called by said calling module is complete, return to said text inputting interface.

Optionally, said scene switching module is further configured to: after returning to said text inputting interface, replace said identifier with the operation result obtained by operating said module called by said calling module.

Optionally, said identifier for calling said application comprises an identification and an application identity, wherein, said identification is used by said mobile terminal to identify that said identifier is an identifier for calling said application, and said application identity is used to indicate said application to be called.

Optionally, said mobile terminal further comprises a setting module, configured to: set a set of applications that can be called, wherein each application in said set corresponds to one or more application identities.

Optionally, said conditions further comprise: said identification being correct, and said application indicated by said application identity belonging to said configured set.

Optionally, said mobile terminal further comprises a reminding module, configured to: after said detecting module detects said identifier for calling said application, remind said user of whether to call said application or not.

In the embodiment of the present document, each application module is called instantly and quickly during the course of text inputting, in addition, the final required data are directly inserted into a text editing position, thus reducing the user operation steps, greatly improving the friendliness of human-computer interaction, improving the overall efficiency, speed and convenience of input, and making the user input experience improved dramatically.

PREFERRED EMBODIMENTS OF THE INVENTION

The embodiments of the present document will be described in detail hereinafter with combination of the accompanying drawings. It should be noted that, in case of no conflict, the embodiments and features of the embodiments in the present application could be combined randomly with each other.

The First Embodiment

Figure 1:
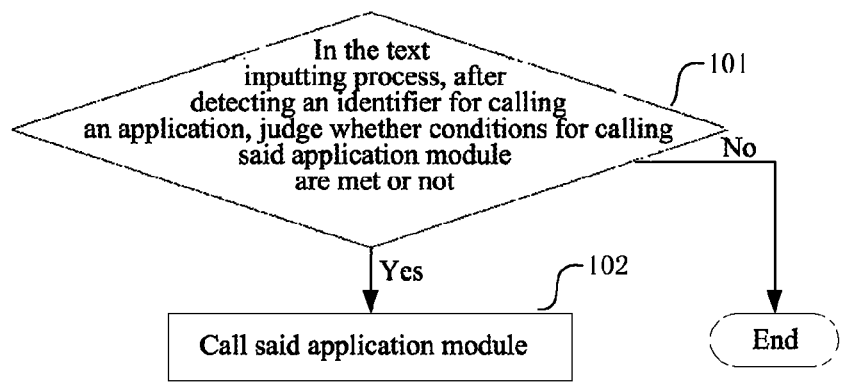
FIG. 1 is a flow chart of the first embodiment in accordance of the present document.

As shown in FIG. 1, comprising:

In step 101, in the text inputting process, after detecting an identifier for calling an application, it is to judge whether conditions for calling said application module are met or not, if yes, it is to proceed to step 102, otherwise, the flow ends; said conditions comprise receiving a command from said user to confirm calling said application.

Specifically, after detecting said identifier for calling said application, it is to remind said user of whether to call said application or not;

The method for reminding said user of whether to call said application or not is highlighting said identifier, and said user clicking on said highlighted identifier is equivalent to sending a command to confirm calling said application. The way of reminding said user can also be popping up a reminding box to remind said user of whether to call said application or not, if said user selects YES, it is equivalent to sending a command to confirm calling said application. The called application is the application indicated by said application identity in said identifier.

The identifier of said called application comprises an identification and an application identity. Wherein, said identification is used by said mobile terminal to identify that said identifier is the identifier for calling said application, it can be preset by the product designer or may be set by the user according to personal input habits. Said application identity is used to indicate the application to be called. Preferably, said user can preset a set of applications to be called, and each application in said set corresponds to one or more application identities, and these application identities may be set by the user, or the user uses each application's default identity rather than setting said identities.

If said user has set a set of applications to be called, the conditions further comprise: the identification being correct, and said application indicated by said application identity belonging to said preset set, which means that, only the identification entered by said user is correct and the application indicated by said application identity belongs to this set, will the user be reminded of whether to call said application or not.

In Step 102, it is to call said application module.

Quick calling can be implemented by calling the module via said identifier.

Preferably, after calling said application module, and after the operations by said user on said module are complete, it is to return to said text inputting interface. Furthermore, after returning to said text inputting interface, the operation result obtained by operating said module is used to replace said identifier in step 101. By replacing said identifier with the operation result, quick inputting can be achieved.

A user can use the method of the present embodiment to quickly call each application module in the inputting process, the user can directly call the calculator to calculate and return the calculation result, directly call the card holder to obtain a contact's phone number, also call the converter to convert exchange rate, call the world time module to check the time all around the world.

The Second Embodiment

The embodiment describes the process from design to application of the solution in accordance with the first embodiment.

In order to quickly call an application module in said text editing process, it needs to perform specific identifier agreement, in this embodiment, the identifier for calling an application in the text inputting process is agreed in the design, and it agrees that the specified application module can be called if the text input content meets said identifier.

Figure 2:
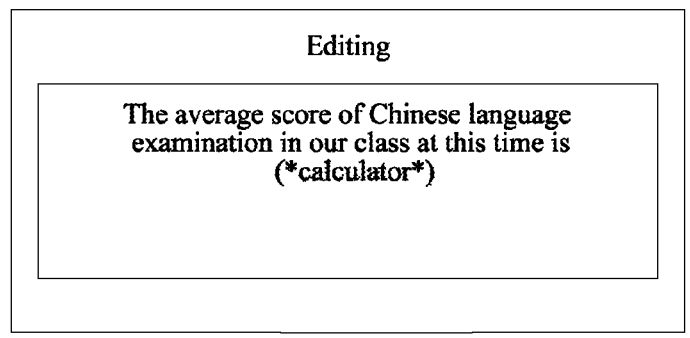
FIG. 2 is a schematic diagram of a terminal interface for calling a common application in the editing process in accordance with the second embodiment of the present document.

Of course that said agreement can be flexible, for example, depending on different operating systems or user group usage habits, different identifiers can be designed. In this embodiment, the identifier "(*xxx*)" is taken as an example, wherein "xxx" is the application identity of the application to be called, as illustrated in FIG. 2, for example, if it needs to quickly call said calculator module, the user can input "(*calculator*)" in the inputting process, when it determines that the input field is complied with said defined identifier, this string is selected with reverse highlighted color as shown in FIG. 2, which means that the desired application can be called. In the specific technology implementation, the user can quickly set up said application identity, for example, the applications identity of said calculator application can be set as "1", and the application identity of said card holder application can be set as "2", and so on.

Preferably, in order to make the present embodiment applicable to a variety of locales, the completeness of the identifier judgment can be enhanced, that is, in various locales, accurate judgments can be made for the field of said identifier, such that this function can be achieved in all languages, such as the above example of calling said calculator, if the input identifier is "(*Calculator*)", the calculator module then can still be called.

Taking into account that different users have different needs in the inputting process, each application module has different using frequency, so that the users can preset a set of application modules to be called on the terminal in the inputting process to meet the needs of different requirements from different users, for example, for users who perform digital computing and data exchange and display often, said calculator module can be set as a common application module; For users who travel for business frequently, the world time query module can be set as a common application module; for users who often need customer information, the card holder module can be set as a common application module, while those application modules that are not commonly used can be not set in the set of common applications. Therefore, even if a user inputs a field meeting an identifier format during inputting, it will not be understood as inputting syntax for quickly calling said application module in the inputting process, thus, on the one hand, it meets the individual needs of different users, and on the other hand, it reduces the probability of misuse in the inputting process as the user inputs the identifier for calling the application.

Figure 3:
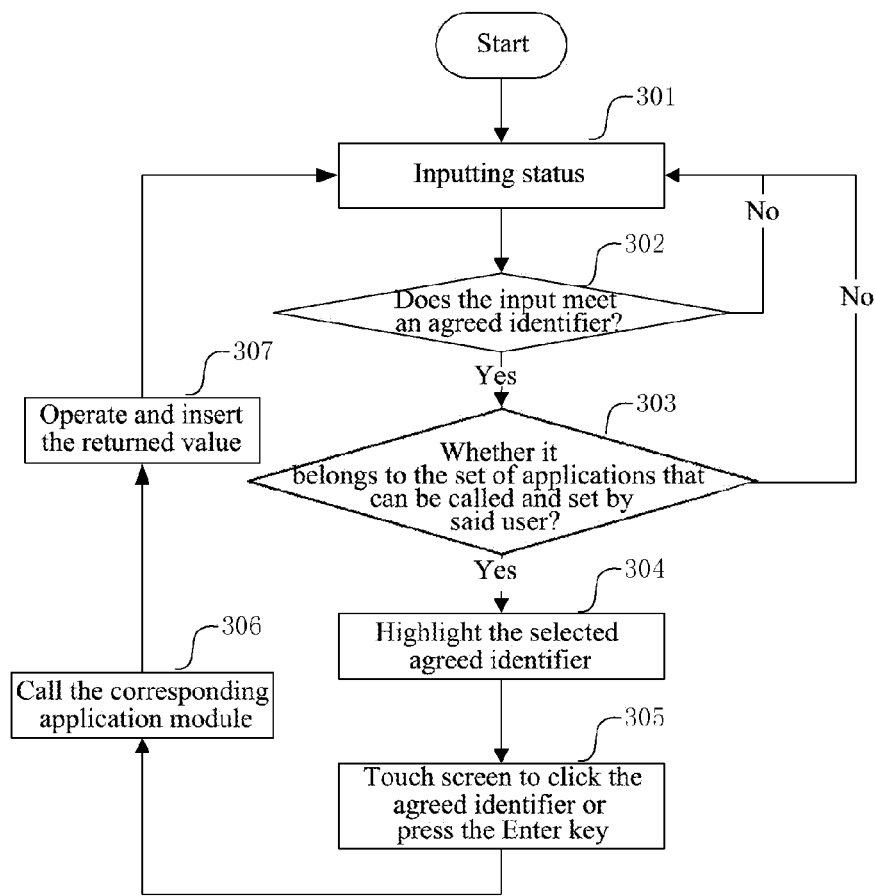
FIG. 3 is a flow chart of the second embodiment in accordance with the present document.

As shown in FIG. 3, it comprises the following steps:

In step 301, the current interface is in the text inputting status;

this text inputting status may be any text inputting scene such as short message inputting, e-mail editing or memo editing, and so on.

In step 302, it is to judge whether the current input is a pre-agreed identifier or not, if yes, it is to proceed to step 303, otherwise, it is to return to step 301;

In step 303, it is to judge whether it belongs to the set of applications that can be called by said user or not, if yes, it is to proceed to step 304, otherwise, it is to return to step 301;

In step 304, when the field input by said user is an identifier for calling an application, said identifier is displayed as highlighting selected, as "(*calculator*)" shown in FIG. 2;

In step 305, it is to receive a command sent by said user to confirm calling said application, for example, the user clicks said highlighted field, or the user presses the Enter key;

In step 306, it is to call the corresponding application for the user to perform the function operation of said application;

In step 307, the user operation ends, and the called application module is closed, the original text editing application is activated again, the operation result of the previously called application module can be directly inserted into the inputting text box to replace the previously highlighted and selected identifier for calling said application.

This method can be widely used in today's popular touch screen mobile phones and can also be used in a variety of traditional hard keyboard mobile phones. For touch-screen phones, the user can click the highlighted part and the current site is saved by the program, and said application module is instantly called according to the input application identity; for key-press phones, the user presses the Enter key to save the site and call the application module corresponding to the application identity. After calling said application module, the user enters into the operational process of the called module, for example, if said calculator module is called, the appropriate arithmetic calculation can be made; if said name holder module is called, a contact's phone, working place, mailing address and other information can be viewed; if the unit conversion module is called, parameters such as exchange rate, area and temperature can be converted; if the world time module is called, the times of the world's major cities can be looked up.

As shown in FIG. 2, if said calculator module is called, and the calculated result is "82.5", then the calculated result is used to directly replace the highlighted identifier "(*Calculator*)", therefore, the text content is "The average score of Chinese language examination in our class at this time is 82.5". Similarly, the name holder module can be called to obtain and directly insert the telephone number, email address, working place and other relevant information into the text, so as other applications.

In other embodiments, the user may only want to call the common application modules, which can also be achieved with the above-mentioned method, that is, using said identifier to call the application module.

In addition, for some applications, there may not be operation result to be directly returned, at this time, after the application module is called, no replacement operation is performed after the original input interface pops up. Alternatively, a reminding box can be popped up to remind the user that the operation result cannot be inserted in. The user can continue to input the text, or manually enter the operation result of the called application, and similarly, the highlighted and selected part of calling said application identity is directly replaced as the input operation result.

The operation result of the application module can be obtained through the relevant interface, or output through written programs. The result can be inserted directly into the text editing page, or it can also be designed that the result is copied to the clipboard and manually inserted by the user.

From the above description, it can be seen that, the common application modules can be called directly in the current interface in the text inputting process with the method of this embodiment, which is quick and efficient, and avoids the traditional way of suspending the current editing state and manually calling the desired application module, thus simplifies the procedure and makes the entire input coherent, which is convenient and also greatly enhances the overall experience of the user input.

The Third Embodiment

This embodiment introduces the mobile terminal that achieves the abovementioned method, and said mobile terminal comprises a detecting module, a condition judging module and a calling module, wherein:

said detecting module is configured to: in the text inputting process, detect whether there is an identifier for calling said application;

said condition judging module is configured to: after said detecting module detects said identifier for calling said application, judge whether the conditions for calling said application module are met or not, wherein said conditions comprise receiving a command from said user to confirm calling said application;

said calling module is configured to: after said condition judging module determines that said conditions for calling said application module are met, call said application module.

Optionally, said mobile terminal further comprises a scene switching module, which is configured to: after the operation by said user on the module called by said calling module is complete, return to said text inputting interface. Said scene switching module is further used to: after returning to said text inputting interface, replace said identifier with the operation result obtained by operating said module called by said calling module.

Optionally, said mobile terminal further comprises a setting module, configured to: set a set of applications to be called, wherein each application in said set corresponds to one or more application identities.

Optionally, said mobile terminal further comprises a reminding module, configured to: after said detecting module detects said identifier for calling said application, remind said user of whether to call said application or not.

The person of ordinary skill in the art can understand that all or part of the steps in the aforementioned method can be completed by a program instructing the related hardware, and the program can be stored in a computer readable storage medium, such as a read-only memory, disk, or CD-ROM. Optionally, all or part of the steps in the aforementioned embodiments can also be achieved with one or more integrated circuits. Accordingly, each module unit in the aforementioned embodiments can be implemented in the form of hardware or software functional modules. The present document is not limited to any particular form of hardware and software combination.

The above description is only used to illustrate rather than limit the present document, and it only illustrates the present document in detail with reference to the preferred embodiments. Those skilled in the field should understand that a variety of changes and modifications can be made based on the present document without departing from the spirit and substance of the present document, and these changes and modifications should belong to the protection scope of the appended claims of the present document.

Industrial Applicability

In the embodiment of the present document, each application module is called instantly and quickly during the course of text inputting, in addition, the final required data are directly inserted into a text editing position, thus reducing the user operation steps, greatly improving the friendliness of human-computer interaction, improving the overall efficiency, speed and convenience of input, and making the user input experience improved dramatically.

What is claimed is:

1. A method for calling an application module, comprising:
in a text inputting process, after a mobile terminal detects an identifier for calling an application, the mobile terminal determining that conditions for calling said application module are met, and calling said application module, wherein said conditions comprise receiving a command from a user to confirm calling said application.

2. The method of claim 1, wherein,
after calling said application module, said method further comprises: returning to a text inputting interface after operations by said user on said application module are complete.

3. The method of claim 2, wherein,
after returning to said text input interface, said method further comprises: replacing said identifier with an operation result obtained by operating said module.

4. The method of claim 1, wherein,
said identifier for calling said application comprises an identification and an application identity, wherein, said identification is used by said mobile terminal to identify that said identifier is an identifier for calling said application, and said application identity is used to indicate said application to be called.

5. The method of claim 4, wherein:
before said text inputting process, said method further comprises pre-setting on said mobile terminal a set of applications that can be called, wherein each application in said set corresponds to one or more application identities.

6. The method of claim 5, wherein:
said conditions further comprise: said identification being correct, and said application indicated by said application identity belonging to the preset set.

7. The method of claim 1, wherein:
after said mobile terminal detects said identifier for calling said application, said method further comprises: reminding said user of whether to call said application or not.

8. The method of claim 7, wherein:
the step of reminding said user of whether to call said application or not comprises:
using a way of highlighting said identifier to pop-up a reminding box to said user to remind said user of whether to call said application or not.

9. A mobile terminal for calling an application module, comprising a detecting module, a condition judging module and a calling module, wherein:
said detection module is configured to: in a text inputting process, detect whether there is an identifier for calling an application or not;
said condition judging module is configured to: after said detecting module detects said identifier for calling said application, judge whether conditions for calling said application module are met or not, wherein said conditions comprise receiving a command from a user to confirm calling said application;
said calling module is configured to: after said condition judging module determines that said conditions for calling said application module are met, call said application module.

10. The mobile terminal of claim 9, further comprising a scene switching module, wherein, said scene switching module is configured to: after operations by said user on the module called by said calling module is complete, return to a text inputting interface.

11. The mobile terminal of claim 10, wherein:
said scene switching module is further configured to: after returning to said text inputting interface, replace said identifier with an operation result obtained by operating said module called by said calling module.

12. The mobile terminal of claim 9, wherein:
said identifier for calling said application comprises an identification and an application identity, wherein, said identification is used by said mobile terminal to identify that said identifier is an identifier for calling said application, and said application identity is used to indicate said application to be called.

13. The mobile terminal of claim 12, further comprising a setting module, wherein,
said setting module is configured to: configure a set of applications to be called, and each application in said set corresponds to one or more application identities.

14. The mobile terminal of claim 13, wherein:
said conditions further comprise: said identification being correct, and said application indicated by said application identity belonging to the configured set.

15. The mobile terminal of claim 9, further comprising a reminding module, wherein,
said reminding module is configured to: after said detecting module detects said identifier for calling said application, remind said user of whether to call said application or not.

* * * * *